United States Patent
H et al.

(10) Patent No.: US 11,960,440 B2
(45) Date of Patent: Apr. 16, 2024

(54) TRANSIENT MASTER DATA

(71) Applicant: SAP SE, Walldorf (DE)

(72) Inventors: Karthik H, Bangalore (IN); Krishna Mayya, Bangalore (IN)

(73) Assignee: SAP SE, Walldorf (DE)

( * ) Notice: Subject to any disclaimer, the term of this patent is extended or adjusted under 35 U.S.C. 154(b) by 256 days.

(21) Appl. No.: 17/388,992

(22) Filed: Jul. 29, 2021

(65) Prior Publication Data
US 2023/0030825 A1    Feb. 2, 2023

(51) Int. Cl.
| | |
|---|---|
| *G06F 16/11* | (2019.01) |
| *G06F 16/17* | (2019.01) |
| *G06F 16/176* | (2019.01) |
| *G06F 16/18* | (2019.01) |

(52) U.S. Cl.
CPC .......... *G06F 16/122* (2019.01); *G06F 16/113* (2019.01); *G06F 16/1734* (2019.01); *G06F 16/176* (2019.01); *G06F 16/1873* (2019.01)

(58) Field of Classification Search
CPC ....... G06F 16/122–125; G06F 16/1873; G06F 16/176–1774; G06F 16/11–113; G06F 16/1734
USPC ......................................................... 707/694
See application file for complete search history.

(56) References Cited

U.S. PATENT DOCUMENTS

| | | | | |
|---|---|---|---|---|
| 8,635,113 B2 * | 1/2014 | Borders | ............... | G06Q 10/101 |
| | | | | 705/27.1 |
| 8,943,356 B1 * | 1/2015 | Dutch | ................. | G06F 11/1451 |
| | | | | 714/2 |
| 11,403,280 B2 * | 8/2022 | Fuchs | ............... | G06F 16/24568 |
| 2003/0182450 A1 * | 9/2003 | Ong | ...................... | H04L 67/565 |
| | | | | 707/E17.005 |
| 2006/0195831 A1 * | 8/2006 | Bossom | .................. | G06F 9/454 |
| | | | | 717/162 |
| 2007/0150387 A1 * | 6/2007 | Seubert | .................. | G06Q 10/10 |
| | | | | 705/31 |
| 2009/0006156 A1 * | 1/2009 | Hunt | ...................... | G06Q 30/02 |
| | | | | 705/7.11 |

(Continued)

OTHER PUBLICATIONS

Fernando, Lahiru K. W., et al., "Hybrid Framework for Master Data Management", 2017 Seventeenth International Conf on Advances in ICT for Emerging Regions (ICTer), Colombo, Sri Lanka, Sep. 6-9, 2017, pp. 142-148.*

(Continued)

*Primary Examiner* — Robert Stevens
(74) *Attorney, Agent, or Firm* — Fountainhead Law Group P.C.

(57) ABSTRACT

Transient product master data may be used to represent temporarily used objects and resources. Instead of generating complete master data upfront, a placeholder is used in a tracking document for the temporary use. A tracking document for the temporary use includes a placeholder reference. When the product to be used temporarily is selected and ready to be physically moved, attributes and other information of the product may be sent to a management system via an interface. This information may be used to automatically generate transient material master data that is accessible using a reference. This reference may be used to update the placeholder reference in the tracking document and it may be used in further tracking documents.

20 Claims, 7 Drawing Sheets

(56) References Cited

U.S. PATENT DOCUMENTS

| | | | |
|---|---|---|---|
| 2009/0024420 A1* | 1/2009 | Winkler | G06Q 40/08 705/4 |
| 2009/0063489 A1* | 3/2009 | Neumann | G06F 16/2329 |
| 2013/0144790 A1* | 6/2013 | Clements | G16H 10/60 705/51 |
| 2013/0277425 A1* | 10/2013 | Sharma | B65D 90/00 235/376 |
| 2014/0129458 A1* | 5/2014 | Damnjanovic | G06Q 30/018 705/317 |
| 2014/0201737 A1* | 7/2014 | Mitkar | G06F 9/5077 718/1 |
| 2014/0280403 A1* | 9/2014 | Swansegar | G06F 16/9577 707/827 |
| 2014/0324777 A1* | 10/2014 | Novak | G06F 16/1744 707/624 |
| 2017/0270131 A1* | 9/2017 | Bregman | G06F 16/13 |
| 2018/0203874 A1* | 7/2018 | Gkoufas | G06F 16/148 |
| 2019/0130012 A1* | 5/2019 | Franke | G06F 16/2453 |
| 2019/0278818 A1* | 9/2019 | Villafane | G06F 16/9535 |
| 2019/0364092 A1* | 11/2019 | Lau | H04L 67/06 |
| 2020/0125353 A1* | 4/2020 | Bean | G06F 8/65 |
| 2021/0065320 A1* | 3/2021 | Bleiweiss | G06F 40/134 |
| 2021/0357855 A1* | 11/2021 | Avery, Jr. | G06F 3/0482 |

OTHER PUBLICATIONS

Doan, Truc, "How IT department supports the SAP software implementation | Hoang Anh Gia Lai multi-sector company", Bachelor's Thesis, Savonia University of Applied Sciences, Kuopio, Finland, Mar. 25, 2014, 69 pages.*

* cited by examiner

TRANSIENT MASTER DATA

BACKGROUND

The present disclosure pertains to master data and in particular to master data representing physical products and materials that are used temporarily.

Master data refers to data that can be shared across software applications and that may be used or referenced in tracking documents and other operations of the applications. Master data represents individuals, organizations, equipment, products, and materials, for example. Master data may be configured to represent all different types of such objects or resources. In some cases, a listing of all the possible properties and attributes of each type of object or resource is determined upfront by a master data governance team (e.g., a team of people knowledgeable about the types and attributes of the objects or resources). Each individual object or resource may have master data generated according to the template or format predetermined by the governance team. The term master data refers to such information as it is used across multiple tracking documents and other operations. For example, a crane machine is a product that may be represented by product type master data. The master data for the crane may include various properties and attributes of the crane, such as dimensions, weight, volume, handling requirements and information, physical movement requirements and information, purchase information, etc. This master data may be shared between a field logistics application, a resource planning application, and other applications, for example. These applications may reference the product master data for the crane machine in various tracking documents and processes used by each of these applications. Using master data is advantageous because it provides accuracy and consistency compared to each application maintaining its own data source.

Conventionally, master data is used to represent objects or resources owned by an entity but it is not used to represent those that temporarily used (e.g., not owned, rented, or leased) by the entity). As mentioned above, master data for a particular type of object or resource is usually predetermined by a governance team. However, the attributes and properties of a temporarily used product or material may not be known until the actual item is selected and shipped by the vendor or supplier, for example. Furthermore, creation of master data by a master data governance team may take several days or weeks (e.g., due to scheduling and priority or other tasks). This delay is one reason why master data is typically not created or used for temporarily used products or materials. Another reason why master data is not used for temporarily used products or materials is because they may have specific terms, conditions, and restrictions from the supplier and creating master data for temporarily used products or materials opens up the possibility of the software pulling them into other features. This may inadvertently lead to misuse of the temporarily used products or materials.

Because of the delay, risks, and other issues mentioned above many users of software applications based on master data do not create or use master data for temporarily used products or materials. However, failure to create and use master data has drawbacks. The software features and processes are based on using master data and may work best and provide full functionality only when master data is used to represent the objects and resources being managed.

Accordingly, there is a need for transient products and materials that are temporarily used to be represented as master data in software systems while avoiding or mitigating the delays, risks, and other issues mentioned above. The present disclosure addresses these issues and others, as further described below.

SUMMARY

One embodiment provides a computer system comprising one or more processors and one or more machine-readable medium coupled to the one or more processors. The one or more machine-readable medium storing computer program code comprising sets of instructions. The sets of instructions executable by the one or more processors to generate a tracking document for following a lifecycle of a type of product. The tracking document includes a reference where the reference is a placeholder for a particular reference to product master data for a particular product of the type. The instructions are further executable to receive, from an external system, attribute information for the particular product where the attribute information was undetermined when generating the tracking document. The instructions are further executable to generate, in response to receiving the attribute information, the product master data for the particular product based on the attribute information. The product master data for the particular product includes an indication that the particular product is a transient product being used temporarily. The instructions are further executable to store the product master data for the particular product such that it is accessible using a particular reference. The instructions are further executable to update the tracking document to change the reference from the placeholder to the particular reference.

Another embodiment provides one or more non-transitory computer-readable medium storing computer program code. The computer program code comprising sets of instructions to generate a tracking document for following a lifecycle of a type of product. The tracking document includes a reference where the reference being a placeholder for a particular reference to product master data for a particular product of the type. The code further comprises sets of instructions to receive, from an external system, attribute information for the particular product where attribute information was undetermined when generating the tracking document. The code further comprises sets of instructions to generate, in response to receiving the attribute information, the product master data for the particular product based on the attribute information. The product master data for the particular product includes an indication that the particular product is a transient product being used temporarily. The code further comprises sets of instructions to store the product master data for the particular product such that it is accessible using a particular reference. The code further comprises sets of instructions to update the tracking document to change the reference from the placeholder to the particular reference.

Another embodiment provides a computer-implemented method. The method includes generating a tracking document for following a lifecycle of a type of product. The tracking document includes a reference where the reference is a placeholder for a particular reference to product master data for a particular product of the type. The method further includes receiving, from an external system, attribute information for the particular product where the attribute information was undetermined when generating the tracking document. The method further includes generating, in response to receiving the attribute information, the product master data for the particular product based on the attribute information. The product master data for the particular product includes an indication that the particular product is a transient product being used temporarily. The method further includes storing the product master data for the particular product such that it is accessible using a particular reference. The method further includes updating the tracking document to change the reference from the placeholder to the particular reference.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident, based on the language of the different claims, that the claimed subject matter may include some or all of the features in these examples, alone or in combination, and may further include modifications and equivalents of the features and techniques described herein. While certain elements may be depicted as separate components, in some instances one or more of the components may be combined into a single device or system. Likewise, although certain functionality may be described as being performed by a single element or component within the system, the functionality may in some instances be performed by multiple components or elements working together in a functionally coordinated manner. In addition, hardwired circuitry may be used independently or in combination with software instructions to implement the techniques described in this disclosure. The described functionality may be performed by custom hardware components containing hardwired logic for performing operations, or by any combination of computer hardware and programmed computer components. The embodiments described in this disclosure are not limited to any specific combination of hardware circuitry or software. The embodiments can also be practiced in distributed computing environments where operations are performed by remote data processing devices or systems that are linked through one or more wired or wireless networks. Furthermore, the terms "first," "second," "third," "fourth," etc., used herein do not necessarily indicate an ordering or sequence unless indicated. These terms may merely be used for differentiation between different objects or elements without specifying an order.

As described above, master data refers to data that can represent individuals, organizations, equipment, products, materials, and other objects or resources and this master data may be referenced in multiple tracking documents across different applications. Master data represents individuals, organizations, equipment, products, and materials, for example. In some cases, a listing of all the possible properties and attributes of each type of object or resource is determined upfront by a master data governance team. Each individual object or resource may have master data generated according to the predetermined template or format. Using master data is advantageous because it provides accuracy and consistency compared to each application maintaining its own data source.

However, master data may not be used to represent objects or resources that are not owned but are being temporarily used by an entity. As mentioned above, master data for a particular type of object or resource is usually predetermined by a governance team. However, the attributes and properties of a temporarily used product or material may not be known until the actual item is selected and shipped by the supplier, for example. Furthermore, creation of master data may take several days or weeks. This delay one reason why master data is typically not created or used for temporarily used products and materials. Another reason why master data is not used for temporarily used products or materials is because they may have specific terms, conditions, and restrictions from the supplier and creating master data for temporarily used product or material opens up the possibility of the software pulling them into other features of the software, inadvertently causing misuse of the temporarily used objects and resources. However, not using master data also has drawbacks because the software features and processes are based on using master data and may work best and provide full functionality only if master data is used to represent the objects and resources being managed. For instance, while it may be possible to add the temporarily used products/materials from a supplier to a purchase order as a free-text line item, without representing them with actual product master, this has the drawback of not having a master data model to capture all the material details in a tracking line item. Another drawback is that dependent processes such as quality management processes and environmental health and safety processes within the software may not work with free text items because not all of the required information may be included in free text input by a user.

The present disclosure addresses these problems by creating a type of master data for transient, short-lived products and materials which are created on the fly, automatically, not by a master data governance team. This transient master data may also be referred to as "Transient Products" master data or "Transient Materials" master data herein. It is called "transient" because it is short-lived. The Transient Materials and Transient Products master data are generally used and configured as normal material master but with their own transient lifecycle. Transient master data may be automatically created by the software when it is needed (e.g., when a predetermined process is initiated) and are automatically removed (e.g., deleted or archived) when it is no longer needed (e.g., because a temporarily used product has been returned and the corresponding return tracking document has been completed). Transient master data objects may include an indication that they are "transient" or that they are being used to represent temporarily used products or materials. An end of purpose check can routinely determine which transient master data is no longer being referenced by any active document (e.g., an active document has a status that is not the final or complete status). The end of purpose check may remove (e.g., delete or archive) such unused transient master data.

As mentioned above, there are risks of misuse of temporarily used materials (e.g., violating terms and conditions) if they would be accessible by other features of the software. To mitigate this issue, the "scope" of transient product and material master data is always set to "Private" such that transient master data created for temporarily used product or material may only be used in the temporary use context within the software. Furthermore, the software may only allow creation of the transient master data via a special API in some embodiments. That is, transient material and transient product master data may not be created by a master data governance team. In addition, the "transient indicator" in the transient master data may be read-only (e.g., on a general product master view), such that it may not be changed.

As further described below, the lifecycle of a transient master data representing a temporarily used product/material may be created in response to an order confirmation or an advanced notice received from an external system (e.g., the supplier or vendor's system) via an interface. The transient master data may then be referred to in a variety of tracking documents (e.g., tracking documents for an order, tracking documents for physical movement, tracking documents for advanced notice of a product, etc.).

During creation of transient master data, the creation process may check whether there is any existing transient product or transient material master data including the same serial number for the temporarily used product/material. If it does exist, the creation process may refer to that master data. If it does not exist, new master data may be created.

This new type of transient material and transient product master data is advantageous because it avoids delays in creating master data when it is created by a master data governance team (e.g., 1-2 weeks). Instead, transient master data may be created automatically based on order confirmation information or an advanced notice information received by an external system via an interface (e.g., over the network using an application programming interface). It is further advantageous because it may prevent misuse of temporarily used products/materials by setting their scope to be "private" such that the transient master data created for temporarily used product or material may only be used in the temporary use within the software.

Figure 1:
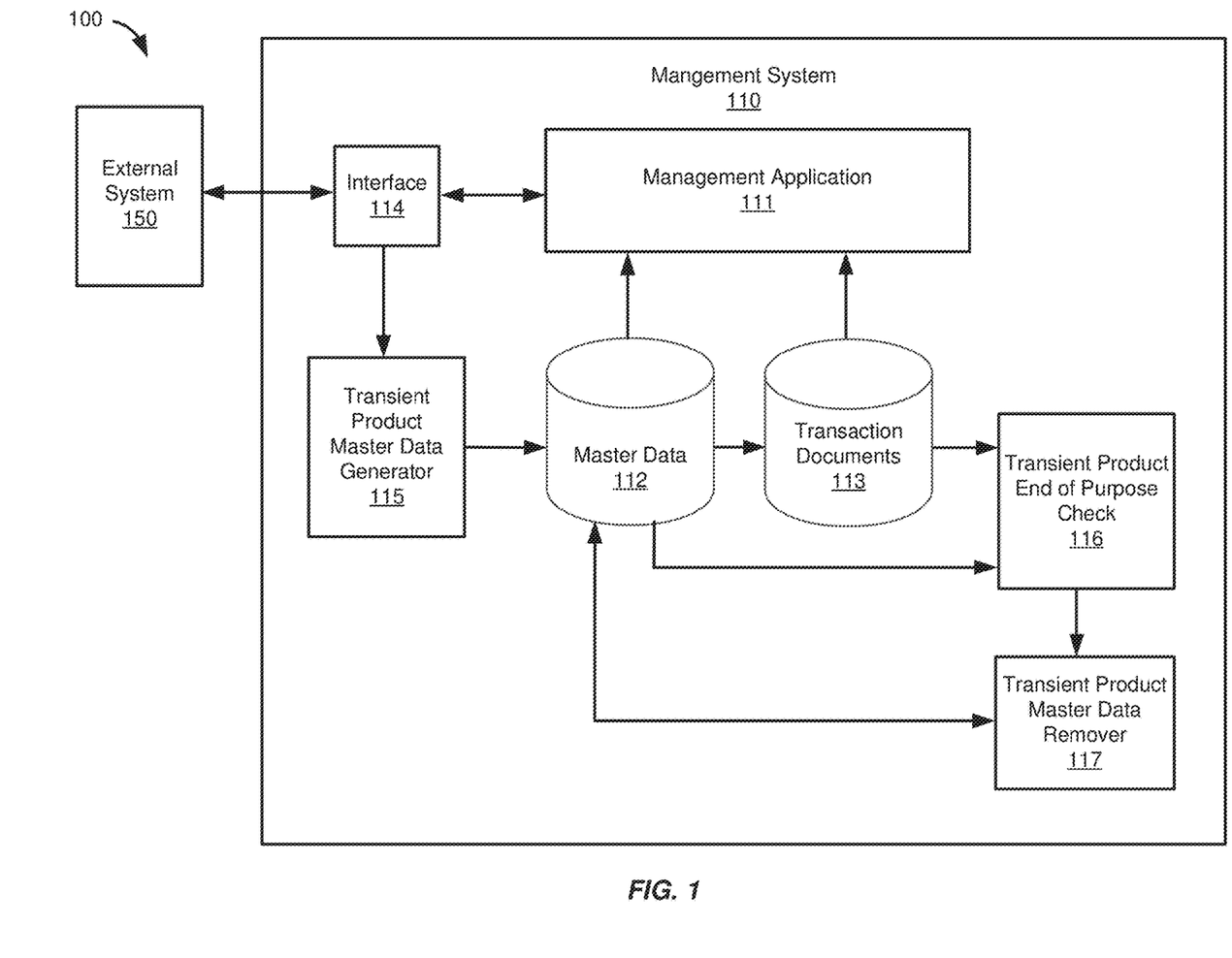
FIG. 1 shows a diagram of a management system operating management software application that uses master data and tracking documents, according to an embodiment.

FIG. 1 shows a diagram 100 of a management system 110 operating management software application 111 that uses master data 112 and tracking documents 113, according to an embodiment. The management system 110 may be a computer system comprised of one or more computers (e.g., server computers, web servers, database servers, etc.). The management system 110 may be used by users of client computer systems (not shown in FIG. 1). The master data 112 and tracking documents 113 may be stored in a database system. The database system may be an in-memory column-oriented database, for example. The management system 110 may include other applications besides the management application 111, which are not shown in FIG. 1. These other application may also access the master data 112 such that master data may be shared and used by several different applications.

The management system 110 includes an interface 114 for communicating with an external system 150 (e.g., over a network such as the Internet). The external system 150 may be a computer system operating software for providing products or materials to be temporarily used. The external system 150 may be configured to provide an order confirmation or advanced notice via the interface 114. The order confirmation or advanced notice may include a serial number of the item being temporarily along with a set of attributes describing the design (e.g., dimensions, weight, color, etc.), features (e.g., available operations and functions of the item, etc.), and requirements (e.g., service, maintenance, warehousing, handling requirements, etc.). The interface 114 may be an application programming interface (API) for example. The interface 114 may be implemented using the simple object access protocol (SOAP) or hypertext transfer protocol secure (HTTPS), for example.

The management system 110 also includes a transient product master data generator 115. In some embodiments the software for implementing the transient product master data generator may be part of the management application 111. The transient product master data generator 115 may also be capable of generating transient material master data. The master data may be generated based on information received from the external system 150 via the interface 114 as described herein. The generation master data may be stored in the database along with the master data 112. As described herein, new types of product and material master data, called "transient product master data" and "transient material master data" are introduced for products and materials being temporarily used (e.g., they are not owned by the organization operating the management system 110). Such master data may be generated by the transient product master data generator 115, as described herein.

The management system 110 also includes a Transient Product End of Purpose Check 116, which may be configured to routinely determine whether any of the transient product or transient material master data is not being referenced by any active document of the tracking documents 113. If a particular transient master data is not being referenced by any active document, then the master data may be removed (e.g., deleted or archived) from the master data 112 by a Transient Product Master Data Remover 117. The end of purpose check for transient master data and the removal of unused transient master data is further described below.

Figure 2:
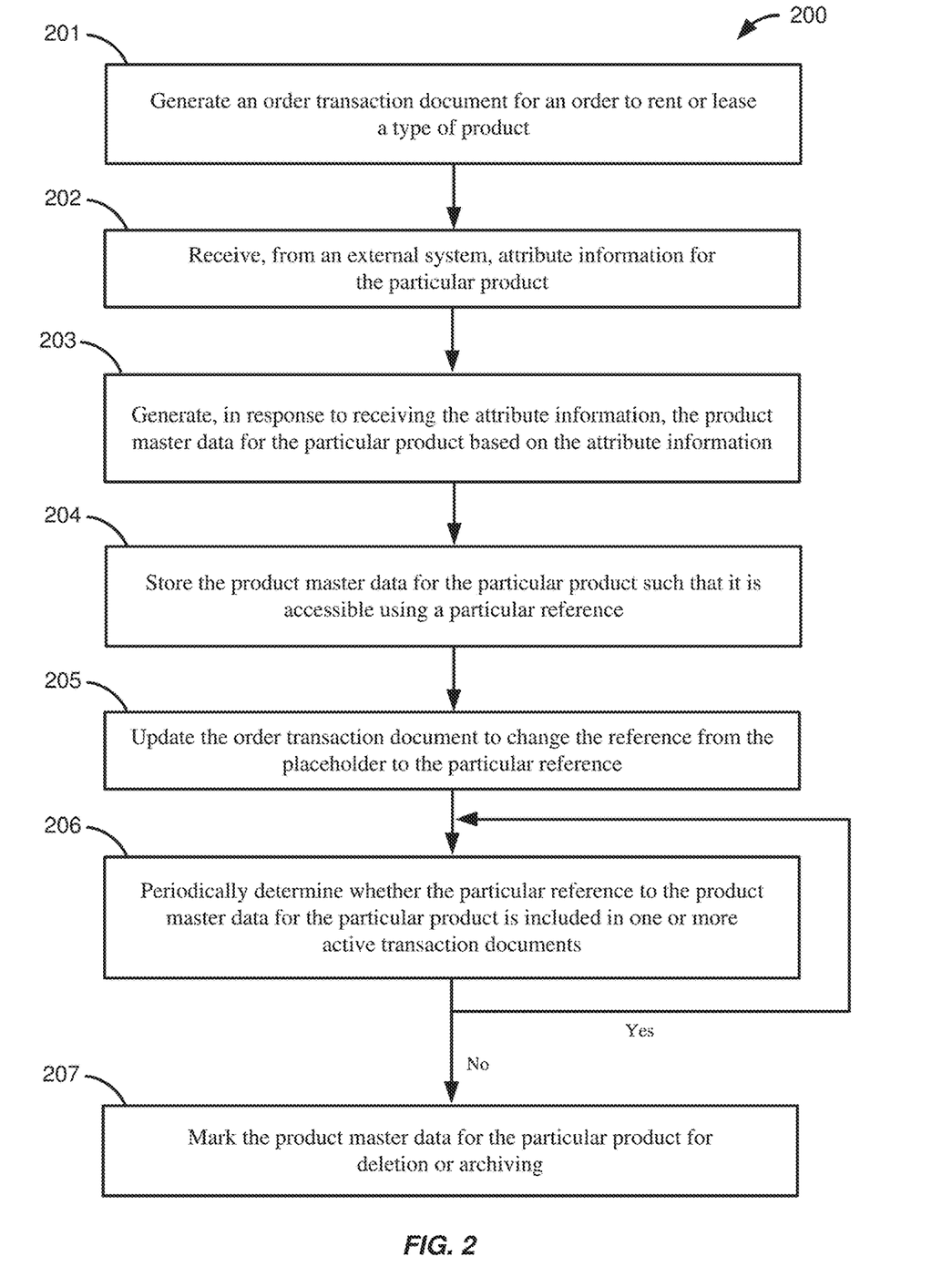
FIG. 2 shows a flowchart of a method for generating master data, according to an embodiment.

FIG. 2 shows a flowchart 200 of a method for generating master data, according to an embodiment. This method may be implemented by a management system (e.g., management system 110) or other computer system.

At 201, the method generates a tracking document following a lifecycle of a type of product. The tracking document includes a reference that is a placeholder for a particular reference to product master data for a particular product of the type. The placeholder reference may be updated later (e.g., at 205) based on information received from an external system. A placeholder reference may be used because the information is not currently available to use when generating the tracking document.

At 202, the method receives, from the external system, attribute information for the particular product. The attribute information may have been undetermined when generating the tracking document because the external system, or a user of the external system, may not have determined or selected the particular product of the type to be used for the temporary use. For example, there may be a variety of different models have different attributes that are each the same type of product and are being temporarily used.

At 203, the method generates, in response to receiving the attribute information, the product master data for the particular product based on the attribute information. The generation of the product master data may be automatically generated without input from a master data governance team. The product master data for the particular product including an indication that the particular product is a transient product being temporarily used.

At 204, the method may store the product master data for the particular product such that it is accessible using a particular reference. The product master data may be stored in a database along with other master data using the particular reference. The master data may be accessible to two or more different software applications.

At 205, the method may update the tracking document to change the reference from the placeholder to the particular reference. Now that the master data has been stored, the reference to use for accessing the master data is known and so the placeholder reference to that master data may be updated. Updating a reference to master data is not performed in conventional system that rely solely on master data governance because in those conventional systems, the master data governance process will have already established the format and templates for master data of all product types being used and such master data would already be available. In conventional systems using master data there is no need to use a placeholder reference in a tracking document and there is no need to update existing tracking documents to change the reference to master data because the proper reference would be used when creating the document.

At 206, the method may periodically determine whether the particular reference to the product master data for the particular product is included in one or more active tracking documents. The one or more active tracking documents being documents that have not been deleted or archived. This periodic determination may be referred to as an end of purpose check. If the master data is being referenced by at least one tracking document ("Yes") then the process will return back to 206, based on a determined period or interval.

If the master data is not being referenced by at least one tracking document ("No"), then at 207 the method may mark the product master data for the particular product for deletion or archiving.

As mentioned above, the method of FIG. 2 may be implemented by the management system 110 of FIG. 1. Such an implemented is further described below. Referring back to FIG. 1, the description of the management system 110 and the management application 111 below will use the oil and gas industry for illustration purposes, other industries and organizations may also implement the management system and software. For example, the management software application 111 may also be used in the mineral and mining industry. In the oil and gas industry, "upstream" may refer to the process of extract oil from the ground, in the sea or on land. "Downstream" refers to the process of moving the oil to oil plants, refining it, distributing it, and soon. In some cases, the upstream process involves oil being extracted using an oil rig platform in the sea. Such off-shore oil platforms typically have limited deck space and can only keep a limited number of items on the platform. In order to receive the supplies and equipment needed, an oil rig platform may coordinate with an on-shore port with ships for physically moving the supplies and equipment, an on-shore warehouse for storing the supplies and equipment, and an on-shore plant for processing the oil. The supplies, equipment, and operators of the oil rig may each be represented by different master data objects stored in master data 112.

If the operators of the oil rig need supplies or equipment that are not available on the platform, they may raise a demand for the particular supplies and equipment needed using the management software. The management software may be used to check inventory at the warehouse to determine if the needed supplies and equipment are available or not. If they are available, the management software may be used to determine which ship may be scheduled to bring the supplies and equipment from the port to the platform. If the supplies or equipment are not available, the management software may be used to generate a service order to purchase the supplies or equipment from an external vendor. It may also handle a lot of the other intricacies involved in providing the supplies and equipment to the oil rig, such as managing physical movement, determining a shipping container, identifying the a time slot for shipment, determining a set of operators to handle the operation, provide the shipment just in time (e.g., not so early that storage is needed and not so late that would cause delay in operations), and returning supplies or equipment to the supplier once the operation is over. The management software may also track and manage quality inspections, handling of hazardous or dangerous good, special handling or warehouse requirements such as freezing, minimum service requirements, and so on.

All of these operations and other field logistics may be provided as features of the management software application 111. To best achieve this functionality, the physical objects and resources of the operation (e.g., individuals, organizations, supplies, equipment, products, materials, and so on) are represented by corresponding master data objects in the master data 112 of the management system 110. That is, each physical object or resource is represented by its own master data object. As mentioned above, the master data 112 may be stored in a database system, such as an in-memory column-oriented relational database management system. The database system may be accessible by the management software application 111 providing field logistics functionality as well as by other software applications (e.g., a human resources software application, a financial planning software application, an enterprise resource planning software application, etc.). These software applications may be operated in a cloud-based system (e.g., clients access the data from remote servers) or they may be operated by an on-premise computer system (e.g., clients and severs are on the same premises).

The processes and operations of the organization running the software applications (e.g., purchase orders, purpose requisitions, physical movement, return initiations, etc.) may be represented by tracking documents 113. Instead of the various different tracking documents including their own data on the objects or resources involved, these documents may reference the corresponding master data 112 for the objects or resources, thereby providing accuracy and consistency between the different software applications.

Figure 3:
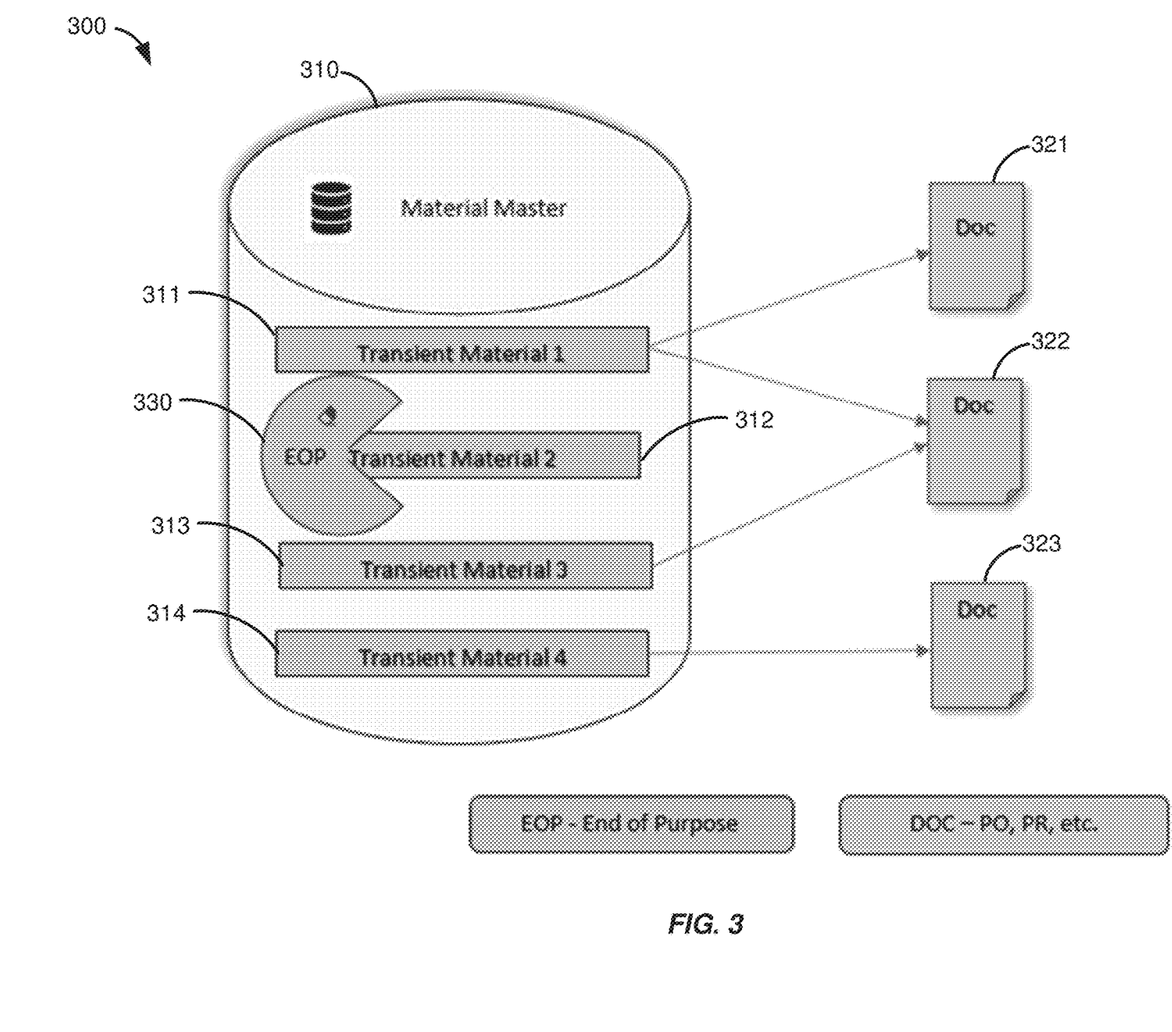
FIG. 3 shows a diagram of material master data referenced by tracking documents, according to an embodiment.

FIG. 3 shows a diagram 300 of material master data 310 referenced by tracking documents, according to an embodiment. The material master data 310 may be stored in a database as described above. In this embodiment, the material master data 310 includes four transient materials. "Transient Material 1" 311 is referenced by a first document 321 and a second document 322. The "Transient Material 2" is not referenced by any document. Accordingly, as shown in FIG. 3, an end of purpose (EOP) process 330 is operating on "Transient Material 2" 312. As described here, transient material or transient product master data that is not being referenced by any active tracking document may be removed (deleted or archived) by a recurring end of purpose process 330. "Transient Material 3" 313 is being referenced by the second document 322. And "Transient Material 4" 314 is being referenced by a third document 323.

Referring back to FIG. 1, the master data 112 may include product master data for representing products. Product master data may have a product type indicator (e.g., raw material, finished goods, fragile material, etc.). The type may drive a lot of other features within the management application 111. For example, the type of product selected may be used by the software to configure the set of information and attributes that are required, or not required, for that particular type of product master data. For example, master data for a raw-type material may be required to include a different set of attributes and information compared to master data for a fragile-type material. These requirements for master data based on type may be configurable in the management system 100 depending on what type of information needs to be captured for a particular type of product.

Figure 4:
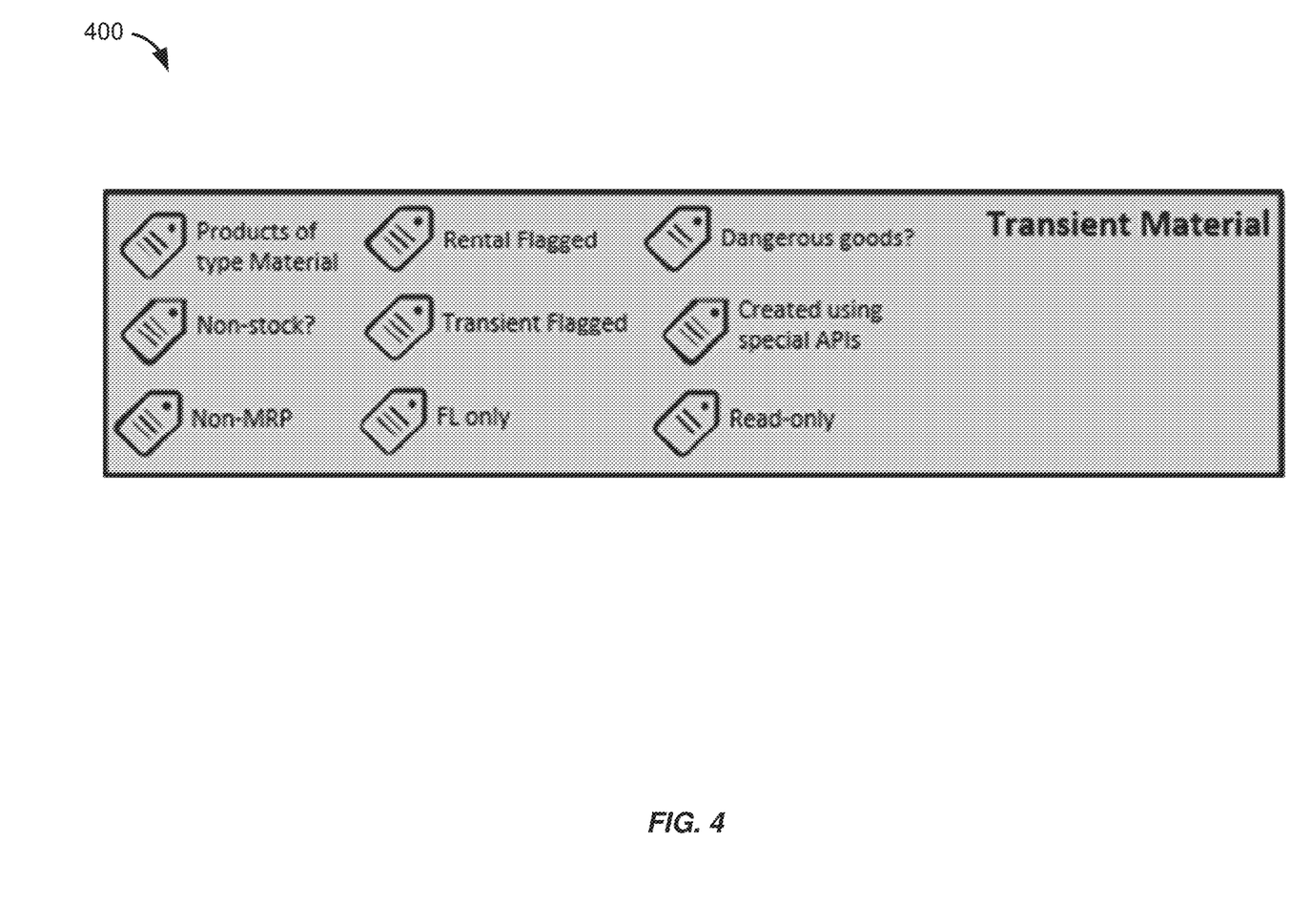
FIG. 4 shows a diagram of tags or attributes used in transient material master data, according to an embodiment.

Because the corresponding products and materials for the transient type of master data are not owned, the footprint of the master data may be reduced compared to the footprint for other master data created by a master data governance team. FIG. 4 shows a diagram 300 of tags or attributes used in transient material master data, according to an embodiment. For example, transient material master data may include the following attributes: "Products of type Material" (e.g., the type of material), "Temporary Use Flagged" (e.g., the material is being temporarily used), "Dangerous Goods?" (e.g., whether the material is hazardous and requires special handling), "non-stock?" (e.g., whether the material is not in stock and must be procured), "transient flagged" (e.g., whether the material is flagged as transient or not), "created using special APIs" (e.g., the material was created based on information received via one or more designated APIs), "Non-MRP" (e.g., whether a Material Requirement Planning functionality of the management software may be used to plan the material), "FL only" (e.g., whether a functional location feature of the management software must be used), and "read-only" (e.g., whether the transient material master data may be changed/written to or not). Other types of transient materials attributes and information may be used in other embodiments. Some of the information used to populate the transient material master data attributes may be obtained from the external system 150 via the interface 114 (e.g., included in an advanced notice or another document). Other attributes may be determined based on the configuration of the management application 111.

Furthermore, transient type master data may be restricted to automated creation or generation by the management system 110 only. That is, transient type master data may only be generated by the Transient Product Master Data Generator 115 of the management system 110 based on information received from the external system 150 via the interface 114. As mentioned above, a master data governance team typically takes 1-2 weeks to create master data for a particular object (e.g., because the people of the governance team may have a list of other master data to be created first or they may have other higher priority tasks to complete first).

Figure 5:
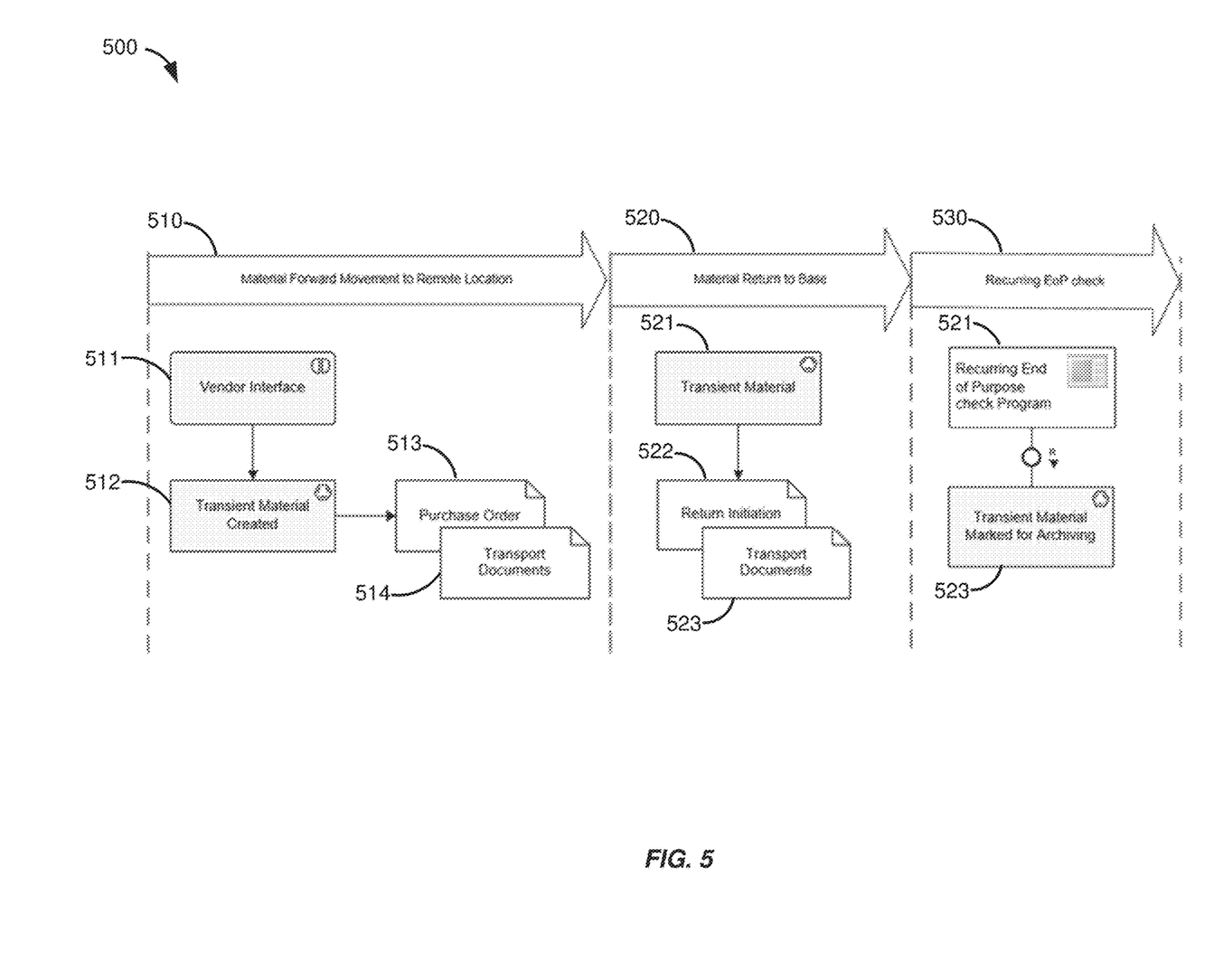
FIG. 5 shows a diagram of a transient material lifecycle, according to an embodiment.

FIG. 5 shows a diagram 500 of a transient material lifecycle, according to an embodiment. An example of an oil rig platform operation temporarily using a crane is provided for illustration purposes. The lifecycle includes material forward movement to remote location at 510, material return to base at 520, and a recurring end of purpose (EOP) check at 530.

Prior to the lifecycle shown in FIG. 5, an operator of the oil rig platform may make a request for a crane. In this request the description of the request master may be free-text (e.g., user input text) stating "100 ft crane." At this point, there is no product master data for this crane because the attributes of the crane is not known by the operator. From this demand is created a purchase requisition. If the requisition is approved, a Purchase Order tracking document 513 may be created. In this example, the tracking document 513 may be a tracking document following a lifecycle of a type of product (i.e., a 100 ft crane). At this point placeholder transient master data may be created for the "100 ft crane." The placeholder master data may be accessible using a placeholder reference. In some cases the placeholder reference does not actually refer to a stored master data object. The placeholder reference if included in the tracking document 513. Later, when the attribute information of the "100 ft crane" is received from an external system (e.g., the vendor's system), then the placeholder master data may be updated or new master data may be created instead. The attribute information may be received in an advanced notice, for example. Furthermore, the placeholder reference in the tracking document 513 may be updated. The tracking document 513 is then sent to the vendor. In this example, the vendor agrees to provide temporary use of the 100 ft crane and selects a particular crane for the temporary use.

In the material forward movement to remove location 510 part of the lifecycle, the vendor interface 511 (e.g., an API), provides information (e.g., serial number, description, attributes, etc.) to a management system. At 512, the transient material master data is created by the management system. This master data is used to update the placeholder reference in the tracking document 513. The master data is also referenced in other tracking documents for the crane including a Physical movement Tracking Document 514 describing the process of physically moving the crane (e.g., physical movement of the crane from the vendor to a warehouse used by the oil rig platform, from the warehouse to the port, or from the port to the oil rig platform). In some cases temporarily used equipment may be needed beyond the original contract length and the temporary use may be extended. The transient master data for the temporarily used equipment may be used in additional documents for further operations.

After operations using the crane are complete, it may be returned to the vendor. In the material return to base 520 part of the lifecycle the transient material 521 (e.g., the 100 ft crane) is returned to the vendor. This operation is described by the return initiation tracking document 522 and a transport tracking document 522. These tracking documents both include the reference to the transient master data created at 512. The transport tracking document 523 may describe the physical movement of the temporarily used equipment from the oil rig platform to the port, from the port to the warehouse, and/or from the warehouse back to the vendor, for example.

In the recurring end of purpose check 530 part of the lifecycle, a recurring end of purpose check program 521 determines whether transient material master data should be marked for archiving at 523 or not. The end of purpose check is further described below.

Figure 6:
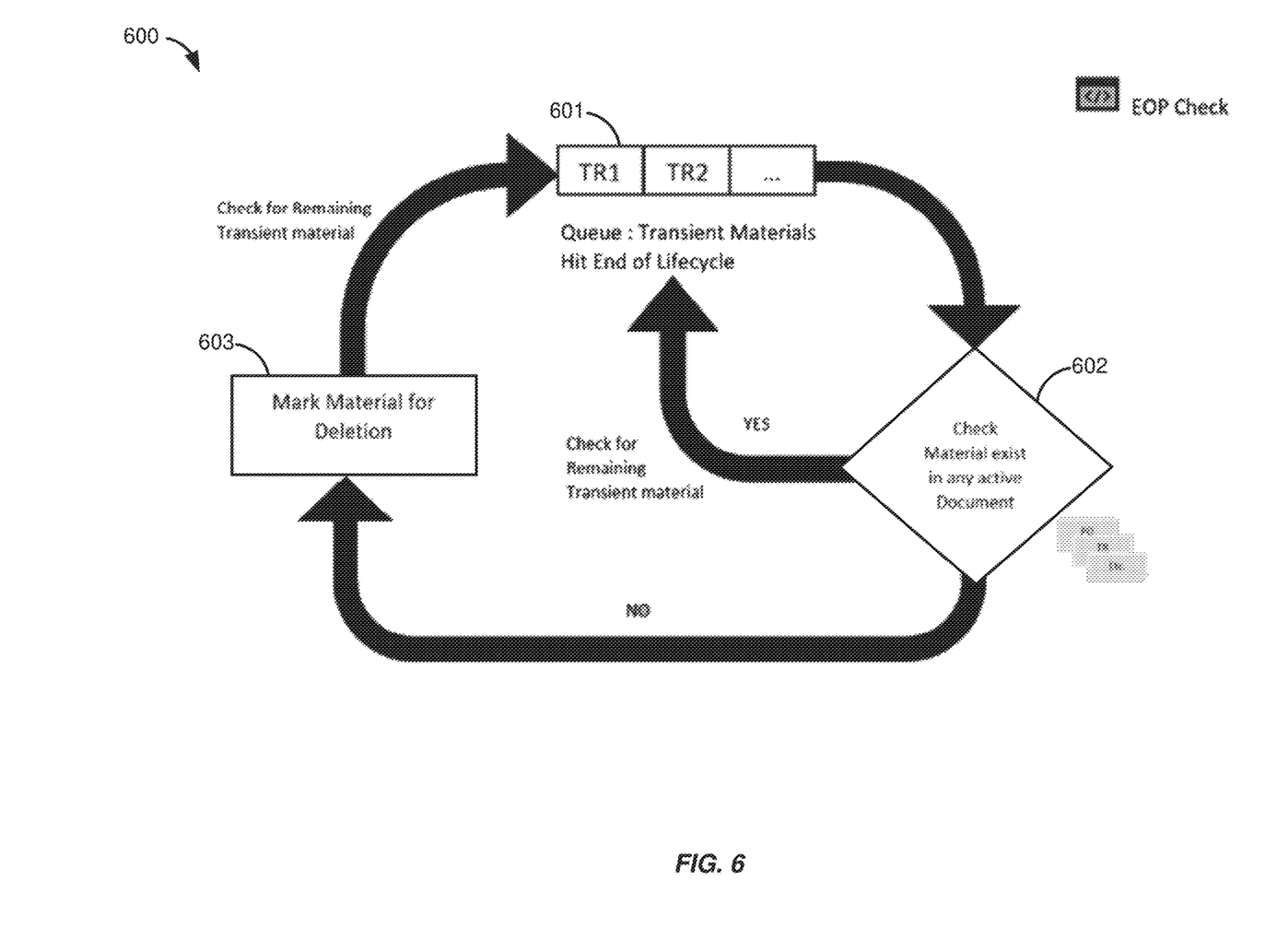
FIG. 6 shows a diagram of a transient material end of purpose check, according to an embodiment.

FIG. 6 shows a diagram 600 of a transient material end of purpose check, according to an embodiment. The recurring transient material end of purchase check may use a queue 601 is transient mater master data currently stored in the system (e.g., the management system or a database system). The queue 601 may be created by the end of purpose check program 521 determining whether master data includes a transient indicator that the material is being temporarily used and adding such master data into the queue 601.

The end of purpose check may iterate over all transient material master data in the queue 601 to determine, at 602, whether the reference to the transient material master data is being referenced by any active tracking documents. For instance, the end of purpose check may identify a set of master data references included in the active tracking documents and then compare these references to the references for master data that is in the queue 601. If a particular transient material master data is being referenced by one or more active tracking documents ("YES"), then the master data is added back to the queue 601. If the particular transient master data is not being referenced by any active document ("NO"), then at 523 the transient material master data is marked for archiving or deletion, at 603.

Figure 7:
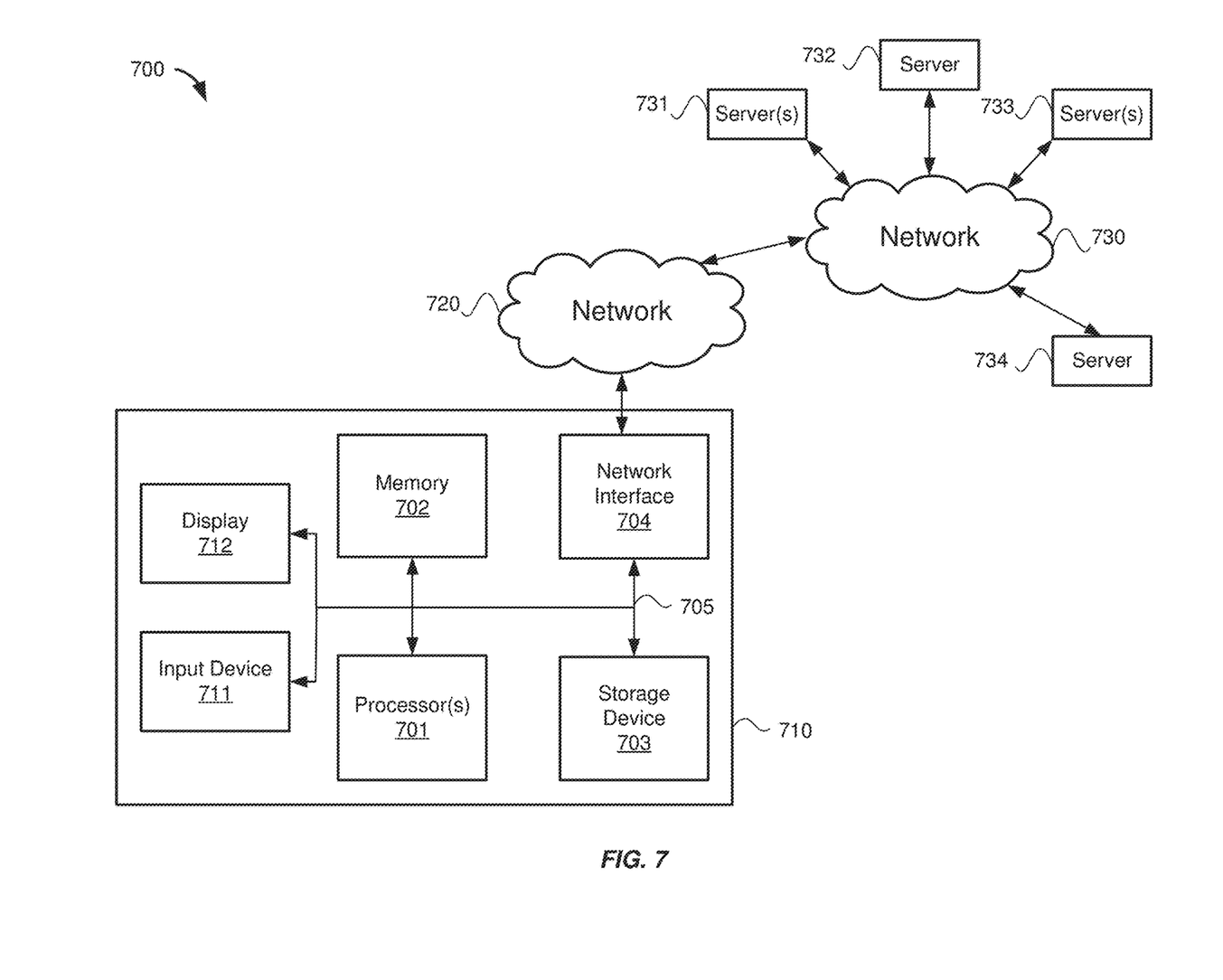
FIG. 7 shows a diagram of hardware of a special purpose computing machine for implementing systems and methods described herein.

FIG. 7 shows a diagram 700 of hardware of a special purpose computing machine for implementing the systems and methods using transient master data described herein. A computer system 710 includes a bus 705 or other communication mechanism for communicating information, and one or more processors 701 coupled with bus 705 for processing information. The computer system 710 also includes a memory 702 coupled to bus 705 for storing information and instructions to be executed by processor 701, including information and instructions for performing some of the techniques described above, for example. This memory may also be used for storing programs executed by processor(s) 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash or other non-volatile memory, a USB memory card, or any other medium from which a computer can read. Storage device 703 may include source code, binary code, or software files for performing the techniques above, such as the processes described above, for example. Storage device and memory are both examples of non-transitory computer readable storage mediums.

The computer system 710 may be coupled via bus 705 to a display 712 for displaying information to a computer user. An input device 711 such as a keyboard, touchscreen, and/or mouse is coupled to bus 705 for communicating information and command selections from the user to processor 701. The combination of these components allows the user to communicate with the system. In some systems, bus 705 represents multiple specialized buses, for example.

The computer system also includes a network interface 704 coupled with bus 705. The network interface 704 may provide two-way data communication between computer system 710 and a network 720. The network interface 704 may be a wireless or wired connection, for example. The computer system 710 can send and receive information through the network interface 704 across a local area network, an Intranet, a cellular network, or the Internet, for example. In the Internet example, a browser, for example, may access data and features on backend systems that may reside on multiple different hardware servers 731-734 across the network. The servers 731-734 may be part of a cloud computing environment, for example.

As described above, a new type of master data referred to as transient master data may be used to represent transient products or materials that are being temporarily used. The transient material master data may include a transient indicator indicating that the material is being temporarily used. This indicator may be read-only so that it may not be changed. The transient master data may also include a private scope or flag such that it may not be used in different contexts or in other software features besides the temporary use context. The temporary use context may be defined by the tracking document or another tracking document. Such transient master data may be automatically created in software without input from a master data governance team. Furthermore, the transient master data may be automatically deleted by a recurring end of purpose check. This new type of transient material and transient product master data is advantageous because it avoids delays in creating master data when it is created by a master data governance team (e.g., 1-2 weeks). It is further advantageous because it may prevent misuse of temporarily used products/materials by setting their scope to be "private" such that the transient master data created for temporarily used products and materials may only be used in the temporary use context within the software.

Additional Embodiments

Additional embodiments of the present disclosure are further described below.

One embodiment provides a computer system comprising one or more processors and one or more machine-readable medium coupled to the one or more processors. The one or more machine-readable medium storing computer program code comprising sets of instructions. The sets of instructions executable by the one or more processors to generate a tracking document for following a lifecycle of a type of product. The tracking document includes a reference where the reference is a placeholder for a particular reference to product master data for a particular product of the type. The instructions are further executable to receive, from an external system, attribute information for the particular product where the attribute information was undetermined when generating the tracking document. The instructions are further executable to generate, in response to receiving the attribute information, the product master data for the particular product based on the attribute information. The product master data for the particular product includes an indication that the particular product is a transient product being used temporarily. The instructions are further executable to store the product master data for the particular product such that it is accessible using a particular reference. The instructions are further executable to update the tracking document to change the reference from the placeholder to the particular reference.

In some embodiments, the computer program code further comprises sets of instructions executable by the one or more processors to periodically determine whether the particular reference to the product master data for the particular product is included in one or more active tracking documents and to mark the product master data for the particular product for deletion or archiving upon determining that the particular reference is not included in any of the one or more active tracking documents.

In some embodiments, each of the one or more active tracking documents include one or more status indicators indicating that a last state of lifecycle has not been reached.

In some embodiments, the product master data for the particular product is stored such that it is read-only and may not be edited by users.

In some embodiments, the computer program code further comprises sets of instructions executable by the one or more processors to receive, from the external system, physical movement information for physical movement of the particular product, generate a corresponding tracking document including the particular reference to the stored product master data for the particular product, and store the corresponding tracking document.

In some embodiments, the physical movement information is included in an advanced notice, the advanced notice further including the attribute information for the particular product. In In some embodiments, other product master data for the other products may not include a transient product indication unless the other product master data is generated in response to receiving the attribute information along with the physical movement information.

Another embodiment provides one or more non-transitory computer-readable medium storing computer program code. The computer program code comprising sets of instructions to generate a tracking document for following a lifecycle of a type of product. The tracking document includes a reference where the reference being a placeholder for a particular reference to product master data for a particular product of the type. The code further comprises sets of instructions to receive, from an external system, attribute information for the particular product where attribute information was undetermined when generating the tracking document. The code further comprises sets of instructions to generate, in response to receiving the attribute information, the product master data for the particular product based on the attribute information. The product master data for the particular product includes an indication that the particular product is a transient product being used temporarily. The code further comprises sets of instructions to store the product master data for the particular product such that it is accessible using a particular reference. The code further comprises sets of instructions to update the tracking document to change the reference from the placeholder to the particular reference.

In some embodiments, the computer program code further comprises sets of instructions to periodically determine whether the particular reference to the product master data for the particular product is included in one or more active tracking documents and to mark the product master data for the particular product for deletion or archiving upon determining that the particular reference is not included in any of the one or more active tracking documents.

In some embodiments, each of the one or more active tracking documents include one or more status indicators indicating that a last state of lifecycle has not been reached.

In some embodiments, the product master data for the particular product is stored such that it is read-only and may not be edited by users.

In some embodiments, the computer program code further comprises sets of instructions to receive, from the external system, physical movement information for physical movement of the particular product, generate a corresponding tracking document including the particular reference to the stored product master data for the particular product, and store the corresponding tracking document.

In some embodiments, the physical movement information is included in an advanced notice, the advanced notice further including the attribute information for the particular product.

In some embodiments, other product master data for the other products may not include a transient product indication unless the other product master data is generated in response to receiving the attribute information along with the physical movement information.

Another embodiment provides a computer-implemented method. The method includes generating a tracking document for following a lifecycle of a type of product. The tracking document includes a reference where the reference is a placeholder for a particular reference to product master data for a particular product of the type. The method further includes receiving, from an external system, attribute information for the particular product where the attribute information was undetermined when generating the tracking document. The method further includes generating, in response to receiving the attribute information, the product master data for the particular product based on the attribute information. The product master data for the particular product includes an indication that the particular product is a transient product being used temporarily. The method further includes storing the product master data for the particular product such that it is accessible using a particular reference. The method further includes updating the tracking document to change the reference from the placeholder to the particular reference.

In some embodiments, the method further comprises periodically determining whether the particular reference to the product master data for the particular product is included in one or more active tracking documents and marking the product master data for the particular product for deletion or archiving upon determining that the particular reference is not included in any of the one or more active tracking documents.

In some embodiments, each of the one or more active tracking documents include one or more status indicators indicating that a last state of lifecycle has not been reached.

In some embodiments, the product master data for the particular product is stored such that it is read-only and may not be edited by users.

In some embodiments, the method further comprises receiving, from the external system, physical movement information for physical movement of the particular product, generating a corresponding tracking document including the particular reference to the stored product master data for the particular product, and storing the corresponding tracking document.

In some embodiments, the physical movement information is included in an advanced notice, the advanced notice further including the attribute information for the particular product.

In some embodiments, other product master data for the other products may not include a transient product indication unless the other product master data is generated in response to receiving the attribute information along with the physical movement information.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:
1. A computer system, comprising:
one or more processors; and one or more machine-readable medium coupled to the one or more processors and storing computer program code comprising sets of instructions for executable by the one or more processors to:
  generate a tracking document for following a lifecycle of a type of product, the tracking document including a reference, the reference being a placeholder for a particular reference to product master data for a particular product of the type;
  receive, from an external system, attribute information for the particular product, the attribute information having been undetermined when generating the tracking document;
  receive, from the external system, physical movement information for physical movement of the particular product;
  generate, in response to receiving the attribute information, the product master data for the particular product based on the attribute information, the product master data for the particular product including an indication that the particular product is a transient product being used temporarily, wherein other product master data for other products does not include a transient product indication unless the other product master data is generated in response to receiving the attribute information along with the physical movement information;
  store the product master data for the particular product such that it is accessible using a particular reference;
  update the tracking document to change the reference from the placeholder to the particular reference;
  generate a corresponding tracking document including the particular reference to the stored product master data for the particular product; and
  store the corresponding tracking document.

2. The computer system of claim 1, wherein the computer program code further comprises sets of instructions executable by the one or more processors to:
  periodically determine whether the particular reference to the product master data for the particular product is included in one or more active tracking documents; and
  mark the product master data for the particular product for deletion or archiving upon determining that the particular reference is not included in any of the one or more active tracking documents.

3. The computer system of claim 2, wherein each of the one or more active tracking documents include one or more status indicators indicating that a last state of lifecycle has not been reached.

4. The computer system of claim 1, wherein the product master data for the particular product is stored such that it is read-only and may not be edited by users.

5. The computer system of claim 1, wherein the physical movement information is included in an advanced notice, the advanced notice further including the attribute information for the particular product.

6. The computer system of claim 5, wherein attribute information comprises design characteristics, features, and requirements.

7. The computer system of claim 1, wherein prior to generating the master data the computer program code further comprises sets of instructions executable by the one or more processors to:
  determine that the attribute information does not match an existing transient product including the serial number.

8. One or more non-transitory computer-readable medium storing computer program code comprising sets of instructions to:
  generate a tracking document for following a lifecycle of a type of product, the tracking document including a reference, the reference being a placeholder for a particular reference to product master data for a particular product of the type;
  receive, from an external system, attribute information for the particular product, the attribute information having been undetermined when generating the tracking document;
  receive, from the external system, physical movement information for physical movement of the particular product;
  generate, in response to receiving the attribute information, the product master data for the particular product based on the attribute information, the product master data for the particular product including an indication that the particular product is a transient product being used temporarily, wherein other product master data for the other products may not include a transient product indication unless the other product master data is generated in response to receiving the attribute information along with the physical movement information;
  store the product master data for the particular product such that it is accessible using a particular reference;
  update the tracking document to change the reference from the placeholder to the particular reference,
  generate a corresponding tracking document including the particular reference to the stored product master data for the particular product; and
  store the corresponding tracking document.

9. The non-transitory computer-readable medium of claim 8, wherein the computer program code further comprises sets of instructions to:
  periodically determine whether the particular reference to the product master data for the particular product is included in one or more active tracking documents; and
  mark the product master data for the particular product for deletion or archiving upon determining that the particular reference is not included in any of the one or more active tracking documents.

10. The non-transitory computer-readable medium of claim 9, wherein each of the one or more active tracking documents include one or more status indicators indicating that a last state of lifecycle has not been reached.

11. The non-transitory computer-readable medium of claim 8, wherein the product master data for the particular product is stored such that it is read-only and may not be edited by users.

12. The non-transitory computer-readable medium of claim 8, wherein the physical movement information is included in an advanced notice, the advanced notice further including the attribute information for the particular product.

13. The non-transitory computer-readable medium of claim 12, wherein attribute information comprises design characteristics, features, and requirements.

14. The non-transitory computer-readable medium of claim 8, wherein prior to generating the master data the computer program code further comprises sets of instructions executable by the one or more processors to:
  determine that the attribute information does not match an existing transient product including the serial number.

15. A computer-implemented method, comprising:
  generating a tracking document for following a lifecycle of a type of product, the tracking document including a reference, the reference being a placeholder for a particular reference to product master data for a particular product of the type;

receiving, from an external system, attribute information for the particular product, the attribute information having been undetermined when generating the tracking document;

receiving, from the external system, physical movement information for physical movement of the particular product, wherein the physical movement information is included in an advanced notice, the advanced notice further including the attribute information for the particular product;

generating, in response to receiving the attribute information, the product master data for the particular product based on the attribute information, the product master data for the particular product including an indication that the particular product is a transient product being used temporarily, wherein other product master data for the other products may not include a transient product indication unless the other product master data is generated in response to receiving the attribute information along with the physical movement information;

storing the product master data for the particular product such that it is accessible using a particular reference;

updating the tracking document to change the reference from the placeholder to the particular references;

generating a corresponding tracking document including the particular reference to the stored product master data for the particular product; and storing the corresponding tracking document.

16. The computer-implemented method of claim 15, further comprising:

periodically determining whether the particular reference to the product master data for the particular product is included in one or more active tracking documents; and marking the product master data for the particular product for deletion or archiving upon determining that the particular reference is not included in any of the one or more active tracking documents.

17. The computer-implemented method of claim 16, wherein each of the one or more active tracking documents include one or more status indicators indicating that a last state of lifecycle has not been reached.

18. The computer-implemented method of claim 15, wherein the product master data for the particular product is stored such that it is read-only and may not be edited by users.

19. The computer-implemented method of claim 15, further comprising prior to generating the master data:

determining that the attribute information does not match an existing transient product including the serial number.

20. The computer-implemented method of claim 15, wherein attribute information comprises design characteristics, features, and requirements.

* * * * *